July 23, 1968  R. O. AARVOLD  3,393,610

PRESSURE MEDIUM OPERATED TORQUE ACTUATOR

Filed April 15, 1966

United States Patent Office 3,393,610
Patented July 23, 1968

3,393,610
PRESSURE MEDIUM OPERATED TORQUE ACTUATOR
Reinhardt Olai Aarvold, Stenkullen, Sweden, assignor to Aktiebolaget Gotaverken, Goteborg, Sweden, a corporation of Sweden
Filed Apr. 15, 1966, Ser. No. 542,929
Claims priority, application Sweden, Apr. 27, 1965, 5,467/65
1 Claim. (Cl. 92—33)

ABSTRACT OF THE DISCLOSURE

In a power hinge or similar actuator a piston working in a cylinder is operable by fluid pressure, the axial movement of the piston being transferred into turning movement of a shaft in the cylinder by means of a transmission containing helical splines. In order to balance the axial forces within the actuator each of the lids closing the ends of this cylinder has essentially the same diameter as the juxtaposed surface of the piston and is fixed to the shaft passing through the cylinder, whereas said lids are provided with sealing means at their circumference to cooperate with internal recesses at the ends of the cylinder within which the lids are rotatably mounted.

---

The present invention refers to a power hinge, i.e., a pressure medium operated device for actuating two hingedly connected parts, in which the axial movement of a piston running in a working cylinder by means of a helical spline transmission located in an axial elongation of the working cylinder is transformed into a turning movement. The working cylinder and the elongation thereof form a housing which is connected to one of said parts, the other part being connected to a rod passing through the cylinder housing as well as through the piston and extending outside both ends of the cylinder.

In devices of this type it is hard to avoid axial forces being transferred to the attachments for the actuator. These forces may be considerable and must be taken care of by separate bearings. Even so great care must be taken to ensure that the attachments will be strong and rigid. Even slight deflections in the attachments bring about lateral forces on the moving parts and thereby increased friction and wear.

It has been proposed to arrange two oppositely working pistons in the same cylinder housing and it has thereby been possible to counterbalance the axial forces within the actuator. A disadvantage of that design is, however, that it is necessary to have twin sets of helical transmission gears which makes the manufacturing costs rather high and the assembly and overhaul difficult.

One object of the present invention is to obtain a good balancing of the axial forces within the actuator even with a single piston actuator.

Another object of the invention is to design the actuator in such a manner that the axial forces produced by the friction in the cylinder housing will be transferred to the rod by way of the end lids.

A further object of the invention is to design the actuator in such a manner that it is easy to assemble and disassemble.

Another object of the invention is to design the actuator in such a manner that it will well withstand also bending moments occurring during the opening and closing movements.

Figure 1:
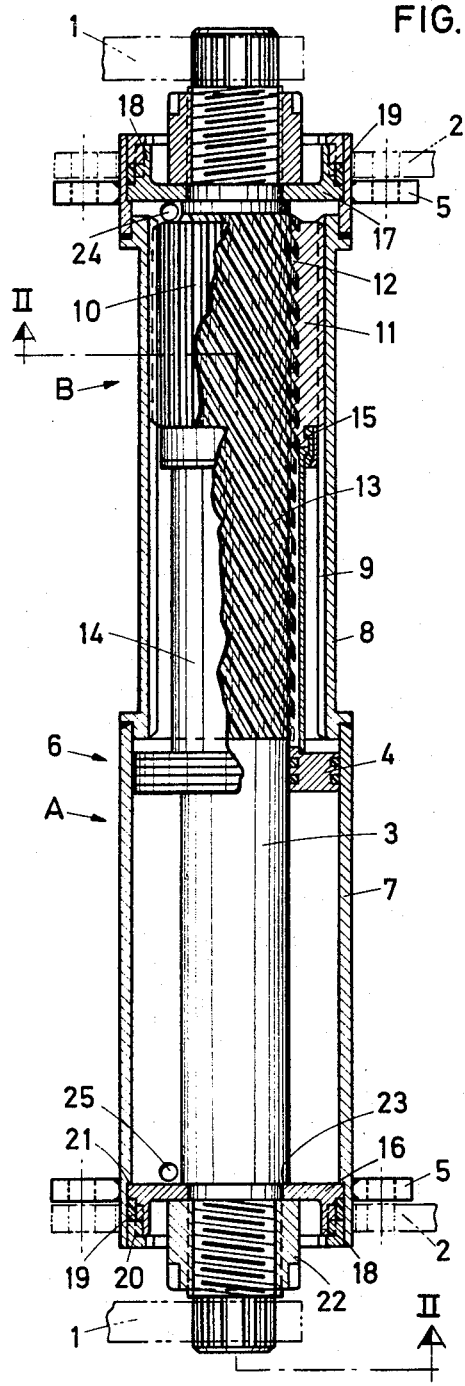
FIG. 1 shows a longitudinal section through a torque actuator according to the invention adapted to operate the sections of a hatch cover.
Figure 2:
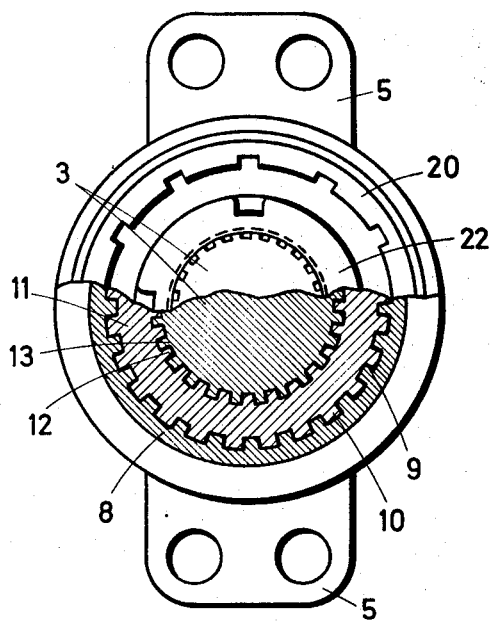
FIG. 2 is an end view, partly cut away along line II—II in FIGURE 1.

The actuator according to the invention is arranged between and unites two hinges which connect two sections of a ship's hatch cover. The hinge fittings connecting the splined ends of the rod to the first of said sections are indicated by 1 and the hinge fittings connecting the cylinder to the second section are indicated by 2. These parts 2 are by means of bolts, not shown, connected to brackets 5 on a cylindrical housing 6. This contains one part A, where the energy of the pressure medium is transferred into mechanical work. This part consists of a working cylinder 7 in which a double acting piston 4 operates. The housing also contains a part B, which is an axial extension of the working cylinder and where the linear movement of the piston is transformed into turning movement. Part B contains a cylinder 8 with internal longitudinal splines 9, which are adapted to cooperate with correspondingly shaped guides 10 on nut sleeve 11 connected to the working piston.

The hinge parts 1 are fixedly connected to the outer ends of a rod 3, which extends through the cylinder housing. This rod will pass through the working piston. The sleeve 11 has internal helical splines 12, which cooperate with correspondingly shaped splines 13 on rod 3. A piston rod 14 connects the piston 4 to the nut sleeve 11, where it is attached by means of a cap nut 15.

Contrary to what has been used earlier the end lids 16, 17 of the cylinder are not fixed to the cylinders 7 or 8, respectively, but are detachably connected to shaft 3 in a fixed axial position. A sealing between the cylinder linings and a circumferential flange 18 arranged at each of the lids 16, 17 is obtained by means of a packing 19 inserted between said members. The flange 18 of the lid is located somewhat inside the rim portion of the lid and is externally threaded for cooperation with a collar nut 20 in such a manner that suitable pressure might be exerted on a packing 19, which is arranged in the recess formed between the rim portion, the flange and the collar nut, respectively. The cylinder linings are provided with a recess 21 adapted to act as an abutment for the cylinder lids so that their innermost position will be fixed. These are fixed on the rod 3 by means of nuts 22 forcing the lids against further abutments 23 on the shaft.

The free area of a cylinder lid 16 or 17, respectively, is mainly equal to the active area of that side of the piston 4, which is turned against the lid in question. The outwardly directed component of the pressure medium acting on the lid will be transferred to shaft 3 and will mainly balance the axial components of the piston movement. The attachments for housing 6 are thus practically relieved of axial forces and might be correspondingly dimensioned. Out of consideration for the bending moments between the hinges at the outer ends of the actuator the shaft 3 must be comparatively thick, i.e., be oversized, and this is utilized for balancing purposes. These big lids will further make assembly and disassembly of the components easy.

When pressure fluid is admitted through opening 24 the working piston 4 is forced downwards (on the drawing) and through a cooperation of the helical splines on the shaft and on the inside of the nut sleeve a turning movement of the shaft in relation to housing 6 will occur. In the same manner a turning movement in opposite direction will of course be obtained if a pressure fluid is admitted through opening 25. In a manner known per se openings 24 and 25 respectively will alternatively serve for the return flow of fluid, which during the movement of the piston are pushed out of the momentarily inactive working chamber.

Constructional variations of the details within the scope of the appended claims may be utilized. The flange 18 of the cylinder lids may thus enclose the cylinder and seal against the outer surface thereof. The helical splines may be arranged on the cylinder or on the rod as well as on the cylinder, in which case the length of the actuator for a certain angular movement may be decreased.

I claim:

1. In a power hinge adapted to connect first and second parts,
   a cylinder; said cylinder having internal recesses at its ends forming abutments;
   a rod passing through the cylinder and extending outside both ends thereof;
   means connecting the extending ends of the rod to the first part and further means attaching the cylinder to the second part;
   a piston in said cylinder;
   conduits attached to the cylinder at opposite sides of the piston for admitting and withdrawing a pressure medium;
   transmission means containing helical splines on a sleeve connected to the piston to cooperate with corresponding parts of the cylinder and the rod, respectively, to transfer the axial movements of the piston into a relative rotational movement between the piston and the rod;
   two ends lids each having a free area essentially equal to the area of that piston side which is turned towards said lid, said lids being rotatably mounted within said recesses and against said abutments to close the ends of the cylinder;
   means to disengagably connect said lids to the rod; and
   sealing means at the circumference of the lids cooperating with the cylinder recesses.

References Cited

UNITED STATES PATENTS

| | | | |
|---|---|---|---|
| 2,394,252 | 2/1946 | Myers | 92—33 |
| 2,959,064 | 11/1960 | Geyer et al. | 92—33 X |
| 3,056,386 | 10/1962 | Aarvold et al. | 92—33 |
| 3,090,244 | 5/1963 | Davis | 92—33 X |
| 3,329,069 | 7/1967 | Feroy | 92—33 |
| 3,339,463 | 9/1967 | Updegrave | 92—31 |

MARTIN P. SCHWADRON, *Primary Examiner.*

I. C. COHEN, *Assistant Examiner.*